United States Patent
Miharu et al.

(10) Patent No.: US 6,835,269 B1
(45) Date of Patent: Dec. 28, 2004

(54) LAMINATED FILM AND METHOD OF PRODUCING THE SAME

(75) Inventors: Kenji Miharu, Chiba (JP); Naozumi Suzuki, Ichihara (JP)

(73) Assignee: DuPont-Mitsui Polychemicals Co., Ltd., Tokyo (JP)

(*) Notice: Subject to any disclaimer, the term of this patent is extended or adjusted under 35 U.S.C. 154(b) by 0 days.

(21) Appl. No.: 09/806,305

(22) PCT Filed: Jun. 15, 2000

(86) PCT No.: PCT/JP00/03904

§ 371 (c)(1),
(2), (4) Date: Mar. 29, 2001

(87) PCT Pub. No.: WO01/12437

PCT Pub. Date: Feb. 22, 2001

(30) Foreign Application Priority Data

Aug. 18, 1999 (JP) .......................................... 11/231527

(51) Int. Cl.$^7$ .......................... B32B 31/04; B32B 31/06; B32B 27/30; B32B 27/32; B32B 27/36

(52) U.S. Cl. ............. 156/244.11; 156/242; 156/244.23; 156/297; 156/327; 156/334; 525/192; 525/194; 525/195; 525/196; 525/221; 525/222; 525/240; 526/317.1; 526/318; 526/318.4; 526/318.6; 526/319; 526/328; 526/328.5; 526/329; 526/173; 428/480; 428/483; 428/343; 428/355 EN; 428/355 AC; 428/522

(58) Field of Search .................................. 428/483, 480, 428/343, 355 EN, 355 AC, 522; 526/317.1, 318, 318.4, 318.6, 319, 328, 328.5, 329; 156/244.11, 242

(56) References Cited

U.S. PATENT DOCUMENTS 3,471,460 A * 10/1969 Rees .......................... 264/523
3,663,334 A * 5/1972 Mueller-Tamm et al. 156/307.3
4,307,211 A * 12/1981 Ito et al. ..................... 525/383
4,732,944 A * 3/1988 Smith, Jr. ............. 260/DIG. 31
5,019,442 A * 5/1991 Ogawa et al. ............... 428/215
5,089,332 A * 2/1992 Feinberg ..................... 428/328
5,106,916 A * 4/1992 Mitchell ..................... 525/255
5,118,746 A * 6/1992 Feinberg ..................... 524/411
5,160,788 A * 11/1992 Feinberg ..................... 428/344
5,679,422 A * 10/1997 Lind et al. .................. 428/34.8
5,712,031 A * 1/1998 Kelch et al. ................. 428/195
5,913,999 A * 6/1999 Hayashida et al. ....... 156/272.2
6,042,930 A * 3/2000 Kelch et al. .............. 428/195.1
6,437,046 B1 * 8/2002 Morris ....................... 525/191

FOREIGN PATENT DOCUMENTS

JP 58-122816 * 7/1983
JP 58-199123 * 11/1983

OTHER PUBLICATIONS

Schimtz, Peter et al., "Films." Ullmann's Encyclopedia of Industrial Chemistry, 5th Ed., vol. A11, 1988, pp. 85–89.*

* cited by examiner

Primary Examiner—Vivian Chen
(74) Attorney, Agent, or Firm—Sherman & Shalloway

(57) ABSTRACT

A laminated film exhibiting excellent interlayer adhesiveness obtained by extrusion-laminating a resin directly on a polyester film without effecting anchor-coating or without treating the molten film of the extrusion-laminated resin with ozone. The laminated film is obtained by extrusion-laminating, onto the polyester film, an ethylene copolymer containing an unsaturated carboxylic acid and a (meth) acrylic acid ester, which may be further blended with a small amount of an ethylene/α-olefin copolymer having a density of 840 to 900 kg/m$^3$, the amount of the unsaturated carboxylic acid component being from 1 to 12% by weight and the amount of the (meth)acrylic acid ester component being from 2 to 25% by weight.

11 Claims, No Drawings

LAMINATED FILM AND METHOD OF PRODUCING THE SAME

TECHNICAL FIELD

The present invention relates to a polyester laminated film obtained by extrusion-laminating an ethylene copolymer resin onto a polyester film, exhibiting excellent interlayer adhesiveness to the polyester surface, and to a method of producing the same. More specifically, the invention relates to a method of producing a polyester laminated film having excellent interlayer adhesiveness by the extrusion-lamination without effecting the anchor-coat treatment on the polyester film or without effecting the ozone treatment on the laminated resin film, and to a laminated film obtained by the above method.

BACKGROUND ART

A polyester film and, particularly, a biaxially stretched polyester film exhibits excellent transparency, toughness and oxygen barrier property, and has been widely used as a base member of packaging materials for packaging foods and industrial materials. In practice, other base member that plays the roll of a reinforcing member, such as polyamide film, ethylene/vinyl alcohol copolymer, aluminum foil, aluminum-deposited polyester film, inorganic material-deposited polyester film or paper, is further laminated on the polyester film and, besides, a heat-sealing resin layer is laminated thereon to impart heat-sealing property.

The films can be laminated by such a laminating method as dry-laminating method, wet-laminating method or extrusion-laminating method. Among them, the extrusion-laminating method is widely used which is most advantageous from the standpoint of cost of production and efficiency. Here, the lamination of the polyester film on the other base member, or the lamination of a heat-sealing layer on the polyester film, is executed by a method which extrusion-laminates an adhesive resin between the polyester film and the other member for the former case or is executed by a method which extrusion-laminates a heat-sealing resin on the polyester film for the latter case.

Here, in order to reinforce the interlayer adhesion between the polyester film and the laminated resin, there is generally employed either (1) a method of effecting the extrusion-lamination after the anchor-coating agent has been applied onto the surface of the polyester film, or (2) a method of executing the ozone treatment on the surface of the molten resin film on where the extrusion laminate is to be adhered as well as the corona treatment and flame treatment on the surface of the polyester film at the time of executing the extrusion lamination. Otherwise, so high interlayer adhesion is not obtained.

However, the above-mentioned method (1) involves such problems as deteriorated working environment due to the scattering of a diluting organic solvent such as ethyl acetate or toluene used as the anchor-coating agent at the time of extrusion-lamination, a rise in the cost of production due to the use of a relatively expensive anchor-coating agent and offensive odor due to organic solvent remaining in the final product (packaging material). On the other hand, the above-mentioned method (2) involves such problems that expensive ozone-treating apparatus and surface-oxidizing apparatus must be provided in a process in the extrusion-laminate processing, requiring extra investment for the facilities and driving up the cost of operation.

It has therefore been strongly urged in the field of packaging industries to provide a method of producing a polyester laminated film having favorable interlayer adhesiveness by the extrusion-laminating method without using the anchor-coating agent or the ozone-treating apparatus which has been so far considered essential. In order to satisfy the above requirement, therefore, the present inventors have conducted keen study, have discovered the fact that use of the anchor-coating agent and the ozone-treating apparatus can be omitted when a resin having a particular composition is extrusion-laminated on the polyester film, and have arrived at the present invention.

SUMMARY OF THE INVENTION

It is therefore an object of the present invention to provide a method of producing a laminated film having excellent interlayer adhesiveness based on the extrusion-lamination method by laminating the polyester films or by laminating the polyester film on another base member film, and a laminated film obtained by this method.

That is, the present invention is concerned with a laminated film obtained by extrusion-laminating, onto at least one surface of a polyester film, an ethylene/unsaturated carboxylic acid/(meth)acrylic acid ester copolymer or a mixture resin composition thereof with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of said extrusion-laminated resin components.

The invention is further concerned with a laminated film obtained by extrusion-laminating, onto at least one surface of a polyester film, a mixture resin comprising:

(a) 100 parts by weight of the mixture resin component of an ethylene/unsaturated carboxylic acid/(meth)acrylic acid ester copolymer or the mixture resin composition of said ethylene/unsaturated carboxylic acid/(meth)acrylic acid ester copolymer with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being rom 2 to 25% by weight with respect to the total amount of the extrusion-laminated resin components, and (b) not more than 30 parts by weight of an ethylene/α-olefin copolymer resin having a density of 840 to 900 kg/cm$^3$.

The invention further relates to a method of producing the laminated film by extrusion-laminating, at a resin temperature of 280 to 340° C., the above extrusion-laminate resin onto a polyester of which the surface has been oxidized and having a surface wet tension of not smaller than 45 dyns/cm.

DETAILED DESCRIPTION OF THE INVENTION

It is desired that a polyester constituting the polyester film used in the present invention chiefly contains, as an acid component, an aromatic dicarboxylic acid and, particularly, a terephthalic acid or a 2,6-naphthalenedicarboxylic acid in an amount of not smaller than 80 mol % and, preferably, not smaller than 90 mol % from the standpoint of transparency, heat resistance, toughness and gas barrier property. As the acid component, there may be further contained other aromatic dicarboxylic acid, such as isophthalic acid, phthalic acid, as well as an alicyclic dicarboxylic acid such as 1,4-cyclohexanedicarboxylic acid or an aliphatic dicarboxylic acid such as adipic acid or sebacic acid as a copolymerizable component. There may be further added trifunctional or more functional carboxylic acids such as trimellitic acid, hemimellitic acid and pyromellitic acid as copolymerizable compounds provided their amounts are small.

As the dihydroxyl compound component constituting the polyester, there can be exemplified an aliphatic glycol such as an ethylene glycol, a propylene glycol, a 1,4-butanediol, a 1,6-hexanediol, a neopentyl glycol, a diethylene glycol and a triethylene glycol, an alicyclic diol such as 1,4-cyclohexanediol, and an aromatic dihydroxyl compound such as bisphenol A ethylene oxide adduct. Among them, it is desired to use the one containing ethylene glycol or 1,4-butanediol in an amount of not smaller than 80 mol % and, preferably, not smaller than 90 mol %. There may be further contained trifunctional or more functional hydroxyl compound such as glycerin, trimethylolpropane or the like provided their amounts are small.

As representative polyesters, there can be exemplified polyethylene terephthalate, polyethylene-2,6-naphthalene dicarboxylate and polybutylene terephthalate.

It is further desired that the polyester has an intrinsic viscosity of from 0.5 to 1.4 dl/g and, particularly, from 0.6 to 1.0 dl/g as measured at 20° C. and at a concentration of 0.4 g/100 ml in a 47/53 (volume ratio) mixture solvent of trifluoroacetic acid/methane dichloride. It is further desired that the polyester has a melting point (temperature exhibiting a maximum endothermic peak as measured by using a differential scanning calorimeter) of not lower than 210° C. and, particularly, not lower than 220° C.

The polyester film can be industrially produced as a single-layer film of polyester by the known T-die cast film method or as a co-extruded film of two or more polyesters or by using other resin than the polyester by the T-die cast film method of the co-extrusion type. They may not be stretched, but are monoaxially stretched or biaxially stretched to enhance the adaptability as the base material film of the packaging material, and are available in the market. It is, however, desired to use the biaxially stretched films since they exhibit markedly improved toughness, transparency, heat resistance and gas barrier property.

In the present invention, the resin to be extrusion-laminated on the polyester film is an ethylene/unsaturated carboxylic acid/(meth)acrylic acid ester copolymer or a mixture resin composition thereof with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of the resin components. That is, either the ethylene/unsaturated carboxylic acid/(meth)acrylic acid ester copolymer is used alone or a mixture resin thereof with the ethylene/unsaturated carboxylic acid copolymer and/or the ethylene/(meth)acrylic acid ester copolymer is used. In either case, the unsaturated carboxylic acid component is contained in an amount of from 1 to 12% by weight and, preferably, from 2 to 6% by weight, and the (meth)acrylic acid ester component is contained in an amount of from 2 to 25% by weight and, preferably, from 6 to 20% by weight, as resins to be extrusion-laminated.

When the amount of the unsaturated carboxylic acid component is smaller than the above-mentioned range, the extrusion-laminated resin loses the polarity and poorly adheres to other polar base member such as polyester film or aluminum foil, and the utility of the laminated film is adversely affected. When the amount of the unsaturated carboxylic acid exceeds the above-mentioned range, on the other hand, the resin loses heat resistance, the unmolten products forms due to the dehydration crosslinking reaction during the extrusion-laminate processing, and foams develop conspicuously due to water. When the amount of the (meth)acrylic acid ester component is smaller than the above-mentioned range, affinity decreases between the extrusion-laminated resin and the polyester film, and the adhesiveness to the polyester decreases. When the amount of the (meth)acrylic acid ester component exceeds the above-mentioned range, on the other hand, the stickiness increases during the extrusion-laminate processing, deteriorating the adaptability for processing.

As the unsaturated carboxylic acid in the ethylene/unsaturated carboxylic acid/(meth)acrylic acid ester copolymer, there can be exemplified acrylic acid, methacrylic acid, ethacrylic acid, fumaric acid, maleic acid, monomethyl maleate and maleic anhydride. Among them, it is particularly desired to use a copolymer of acrylic acid or methacrylic acid. The (meth)acrylic acid ester in the copolymer stands for an acrylic acid ester or a methacrylic acid ester. Concrete examples include esters of such as methyl, ethyl, n-butyl, isobutyl, 2-ethylhexyl, and isooctyl. In the copolymer, the unsaturated carboxylic acid is contained in an amount of, desirably, from 1 to 15% by weight and, particularly, from 2 to 12% by weight, and the (meth)acrylic acid ester is contained in an amount of from 4 to 25% by weight and, particularly, from 6 to 20% by weight. It is further desired that the copolymer has a melt flow rate (MFR) of from 0.5 to 100 g/10 min. and, particularly, from 1 to 50 g/10 min. at 190° C. under a load of 2160 g.

As the ethylene/unsaturated carboxylic acid copolymer that can be used together with the ethylene/unsaturated carboxylic acid/(meth)acrylic acid ester copolymer, there can be exemplified copolymers of ethylene with acrylic acid, methacrylic acid, ethacrylic acid, fumaric acid, maleic acid, monomethyl maleate or maleic anhydride. Among them, it is particularly desired to use an ethylene/acrylic acid copolymer or an ethylene/methacrylic acid copolymer. It is desired that the content of the unsaturated carboxylic acid in the copolymer is from 1 to 15% by weight and, particularly, from 2 to 12% by weight. It is further desired that the copolymer has an MFR of from 0.5 to 100 g/10 min. and, particularly, from 1 to 50 g/10 min. at 190° C. under a load of 2160 g.

As the ethylene/(meth)acrylic acid ester copolymer that can be used together with the ethylene/unsaturated carboxylic acid/(meth)acrylic acid ester copolymer, there can be exemplified a copolymer of an ethylene and a (meth)acrylic acid ester. As the ester component, there can be exemplified esters of such as methyl, ethyl, n-butyl, isobutyl, 2-ethylhexyl and isooctyl. It is further desired that the copolymer has an MFR of from 0.5 to 100 g/10 min. and, particularly, from 1 to 50 g/10 min. at 190° C. under a load of 2160 g.

These ethylene copolymers are obtained by the radical copolymerization at a high temperature and under an elevated pressure.

In the second invention, the resin to be extrusion-laminated is a mixture resin comprising:

(a) 100 parts by weight of the mixture resin component of an ethylene/unsaturated carboxylic acid/(meth)acrylic acid ester copolymer or the mixture resin composition of said ethylene/unsaturated carboxylic acid/(meth)

acrylic acid ester copolymer with an ethylene/ unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of the extrusion-laminated resin components, and (b) not more than 30 parts by weight and preferably, from 5 to 20 parts by weight, and more preferably, from 10 to 20 parts by weight, of an ethylene/α-olefin copolymer resin having a density of 840 to 900 kg/m$^3$.

The ethylene/α-olefin copolymer is a random copolymer of an ethylene and an α-olefin, such as propylene, 1-butene, 1-pentene, 1-hexene, 1-octene, 1-decene or 4-methyl-1-pentene. As such a copolymer, it is desired to use a copolymer of an ethylene and an α-olefin having about 4 to about 8 carbon atoms. Further, the copolymer has a density of from 840 to 900 kg/m$^3$ and, desirably, from 860 to 890 kg/m$^3$.

The ethylene/α-olefin copolymer is used for enhancing the adhesive force to the polyester film. When the density exceeds the above-mentioned range, however, the adhesion to the polyester film is not so much improved. When the density becomes smaller than the above range, on the other hand, the resin becomes so sticky that the handling is deteriorated during the extrusion-lamination processing. When the blended amount exceeds the above-mentioned range, further, the extrusion-laminate processability greatly decreases.

It is further desired that the copolymer has an MFR of from 0.5 to 200 g/10 min. and, particularly, from 1 to 50 g/10 min. at 190° C. under a load of 2160 g. Such a copolymer can be produced by using a combination catalyst of, for example, a transition metal catalyst component such as vanadium compound, zirconium compound or metallocene compound and an organic aluminum compound catalyst component.

The second invention is the same as the first invention except that the amount of the unsaturated carboxylic acid component is from 1 to 12% by weight and, preferably, from 2 to 6% by weight and the amount of the (meth)acrylic acid ester component is from 2 to 25% by weight and, preferably, from 6 to 20% by weight based on the ethylene/polar monomer copolymer in the extrusion-laminated resin.

In the first and second inventions, it is desired that the extrusion-laminated resin has been so adjusted as to exhibit an MFR of from 0.5 to 100 g/10 min. and, particularly, from 1 to 50 g/10 min. at 190° C. under a load of 2160 g by taking the extrusion-laminate processability into consideration.

Further, the carboxylic acid group of the unsaturated carboxylic acid in the extrusion-laminated resin may be partly ionized with an alkali metal or an alkaline earth metal within a range in which the ionization degree is not larger than 20% and, particularly, not larger than 10%. When the ionization degree exceeds 20%, the adhesive force to the polyester film decreases, which is not desirable.

If necessary, further, the resin to be extrusion-laminated may be blended with various additives, such as antioxidant, heat stabilizer, slipping agent and anti-blocking agent. Concretely speaking, as the slipping agent or the anti-blocking agent, there can be used one or two or more of amides of saturated fatty acid or unsaturated fatty acid, such as stearic acid amide, oleic acid amide, erucic acid amide, palmitic acid amide, oleyl palmitamide, stearyl erucamide, N,N'-ethylenebis erucamide, hydrogenated castor oil and silica. It is desired that they are used in an amount of from 0.1 to 5 parts by weight and, particularly, from 0.3 to 3 parts by weight per 100 parts by weight of the extrusion-lamination resin.

The laminated film according to the first invention and the second invention can be produced by using a known extrusion laminator. Described below in detail is a method of producing a laminated film of a two-layer structure comprising a biaxially stretched polyester film/extrusion-laminated resin, which is the simplest constitution of the invention and is a representative embodiment.

The biaxially stretched polyester film is delivered at a constant speed from the base member film delivery portion and is guided to a laminating portion. In the laminating portion, a thin molten film of the to-be-laminated resin heated and melted at a predetermined temperature in the cylinder and is continuously extruded in the form of a thin film from the T-die, is permitted to be hanged directly on the surface of the biaxially stretched polyester film, and the biaxially stretched polyester film and the laminated resin are press-adhered together and cooled simultaneously between the cooling roll and the press-adhering roll, and are then taken up as a product in the take-up portion.

It is desired that the to-be-laminated surface of the biaxially stretched polyester film has a surface wet tension of not smaller than 45 dyns/cm and, more preferably, not smaller than 50 dyns/cm for producing a sufficiently large adhesive force to the extrusion-laminated resin. When the surface wet tension is smaller than 45 dyns/cm, the adhesive force is not sufficient. In order for the surface wet tension of the biaxially stretched polyester film to assume the above-mentioned level, the surface of the film may be oxidized relying upon a known industrial method such as corona treatment or flame treatment. The surface oxidation treatment may be executed in a step of producing the biaxially stretched polyester film or just before the lamination in the step of extrusion-lamination.

It is desired that the extrusion temperature during the extrusion-lamination processing is from 280 to 340° C. and, particularly, from 300 to 330° C. as the resin temperature measured just under the T-die. When the resin temperature is lower than 280° C., the adhesive force is not sufficient between the laminated resin and the polyester film. When the resin temperature is higher than 340° C., on the other hand, the laminated resin is thermally deteriorated to a conspicuous degree.

The two layer-laminated film comprising the polyester film and the extrusion-laminated resin exhibits excellent interlayer adhesiveness to the polyester film owing to the laminated resin, as well as excellent heat-sealing property and hot-tacking property, and can be extensively used as a film for pillow packaging for packaging foods and industrial materials, and as plastic films, sheets, and as a film for thermal lamination on the sheets, papers, metals, woods, etc.

In the laminated film of the invention, other polar member that plays the role of reinforcement can be further laminated on the polyester film via the laminated resin. As the polar base member, there can be exemplified those members having metallic or ceramic surfaces, such as aluminum foil, aluminum-deposited polyester film, aluminum-deposited polypropylene film, silica-deposited polyester film, and alumina-deposited polyester film, as well as plastic films and papers, such as polyamide, ethylene/vinyl alcohol copolymer, etc.

When the polar base member is to be further laminated, there can be employed the so-called extrusion sandwich-lamination method according to which the polyester film is fed from the delivering portion to the laminating portion like in the above-mentioned extrusion-lamination method, the laminated resin is stacked on the polyester film and, at the same time, the polar base member film is fed even from the side opposite to the surface where the laminated resin and the polyester film are laminated one upon the other, so as to be laminated on the laminated resin. According to the sandwich-lamination method, contrary to the above-mentioned procedure, the polar base member is fed from the delivering portion to the laminating portion, the extrusion-laminated resin is stacked on the polar base member and, at the same time, the polyester film is fed from the side opposite to the surface where the laminated resin and the polar base member are laminated one upon the other, so as to be laminated on the laminated resin, which is the extrusion sandwich-lamination method.

Described below are representative examples of laminations of the polyester film and various polar base members via the extrusion-laminated resin. Here, the extrusion-laminated surface of the polar base member may, as required, be oxidized. Usually, however, the laminated resin in the present invention tends to exhibit favorable extrusion-lamination strength for the polar base member without treatment. It is therefore sufficient to install the surface oxidation treatment facility only on the side of the extrusion-laminated surface of the biaxially stretched polyester film.

(a) O-PET/EX/aluminum foil
(b) O-PET/EX/aluminum-deposited polyester
(c) O-PET/EX/aluminum-deposited polypropylene
(d) O-PET/EX/aluminum-deposited polyester
(e) O-PET/EX/ethylene-vinyl alcohol copolymer
(f) O-PET/EX/paper Here, O-PET stands for a biaxially stretched polyester film, and EX stands for an extrusion-laminated resin.

If necessary, further, there may be laminated any other base material film and, for this purpose, there may be employed any known method such as the extrusion laminator that is repetitively used, the tandem laminator or the dry laminator, to obtain a desired laminated film.

There is no particular limitation on the thickness of the laminated film. Usually, however, the polyester film has a thickness of from 1 to 1000 μm and the extrusion-laminated resin layer has a thickness of from 3 to 300 μm.

EXAMPLES

Described below are Examples and Comparative Examples for explaining the effect of the present invention. The starting laminated resin materials used in Examples and in Comparative Examples, method of producing laminated films, and method of evaluating the laminated films were as described below.

1. Starting Resin Materials to be Laminated (A-1) Ethylene/Methacrylic Acid/Isobutyl Acrylate Copolymer ①.
  Content of methacrylic acid: 4% by weight, content of isobutyl acrylate: 15% by weight, MFR: 27 g/10 min.
(A-2) Ethylene/Methacrylic Acid/Isobutyl Acrylate Copolymer ②.
  Content of methacrylic acid: 11% by weight, content of isobutyl acrylate: 8% by weight, MFR: 10 g/10 min.
(B-1) Ethylene/Methacrylic Acid Copolymer ①.
  Content of methacrylic acid: 4% by weight, MFR: 7 g/10 min.
(B-2) Ethylene/Acrylic Acid Copolymer ②.
  Content of acrylic acid: 5% by weight, MFR: 8 g/10 min.
(C-1) Ethylene/α-olefin Copolymer ①.
  α-olefin: 1-butene, density: 885 kg/m$^3$, MFR: 3.6 g/10 min.
(C-2) Ethylene/α-olefin Copolymer ②.
  α-olefin: 1-butene, density: 860 kg/m$^3$, MFR: 35 g/10 min.
(C-3) Ethylene/α-olefin Copolymer ③.
  α-olefin: 1-octene, density: 870 kg/m$^3$, MFR: 35 g/10 min.
(D-1) Polyethylene ①
  Density: 917 kg/m$^3$, MFR 7.0 g/10 min.
(E-1) Ethylene/Ethyl Acrylate Copolymer ①
  Content of ethyl acrylate: 9% by weight, MFR: 5 g/10 min.

2. Method of Producing Laminated Films 2-1. Constitutions of Laminated Films.
Lamination constitution ①: O-PET/laminated resin (25 μm)
Lamination constitution ②: O-PET/laminated resin (25 μm)/base member film (a)
Lamination constitution ③: O-PET/laminated resin (25 μm)/base member film (b)
  O-PET: Biaxially stretched polyester film (12 μm), P60 (one surface is corona-treated) produced by Toray Co.
  Base member film (a): aluminum foil (7 μm)/biaxially stretched polyester film (12 μm)
  Base member film (b): polyethylene (20 μm)/anchor-coating agent/biaxially stretched polyester film (12 μm).

2-2. Method of Extrusion-lamination.

Resin pellets prepared to have a predetermined composition were melt-extruded onto the biaxially stretched polyester film by using an extrusion laminator, to prepare laminated films having the above-mentioned lamination constitutions ①, ② and ③ under the following production conditions.

Extrusion laminator: 65 mm-diameter extruder, opening width of T-die, 500 mm.
Extrusion laminator processing rate: 80 m/min.
Extruded resin temperature: 270 to 350° C. (resin temperature just under the T-die is measured using a contact-type thermometer).
Air gap: 120 mm In the case of the lamination constitution ①, the biaxially stretched polyester film was delivered, and the resin to be laminated was laminated by extrusion. In the cases of the lamination constitutions ② and ③, the biaxially stretched polyester film was delivered, and the resin to be laminated was sandwich-laminated on the base member films (a) and (b), respectively.

3. Items to be Evaluated and Methods of Evaluation 3-1. Extrusion-lamination Processability of the Laminated Resin.

The stability of the laminated film during the extrusion-laminate processing in 2-2 above was evaluated by naked eyes. In this observation by eyes, there were maintained the sampling conditions of laminated films at a processing rate of 80 m/min. and a thickness of extruded laminate of 25 μm, and the extrusion conditions of a processing rate of 80 m/min. and a thickness of the extruded laminate of 25 μm. A maximum processing rate was evaluated while gradually increasing the processing rate only. The target of extrusion-lamination processability was set to be the maximum processing rate of not smaller than 200 m/min, and the processing rates of lower than this value were judged to be of not practicable levels.

3-2. Adhesiveness Between the Polyester Film and the Laminated Resin.

An extrusion-laminated sample (lamination constitution ③) two days after the production was measured under the conditions of a sample width of 15 mm, a peeling angle of 90 degrees and a tension speed of 300 mm/min. The degree of oxidation on the laminated surface of the polyester film was judged relying upon a measured value of surface wet tension. The surface wet tension was measured by using a wet tension measuring solution (produced by Wako Junyaku Co.). A target value of the adhesion strength was set to be 3 N/15 mm, and the adhesion strengths smaller than this value were judged to be of not practicable levels.

3-3. Adhesiveness Between the Aluminum Foil and the Laminated Resin.

An extrusion-laminated sample (lamination constitution ②) one day after the production was measured under the conditions of a sample width of 15 mm, a peeling angle of 90 degrees and a tension speed of 300 mm/min. A target value of the adhesion strength was set to be 2 N/15 mm, and the adhesion strengths smaller than this value were judged to be of not practicable levels.

3-4. Heat-sealing Property of the Laminated Film.

The laminated resin surfaces of the samples (lamination constitution ①) were heat-sealed by using a heat sealer to measure the heat-sealing strength. The heat sealer was a one surface-heated bar sealer (produced by Toyo Seiki co.), and the sealing pressure was 0.2 MPa (real pressure) and the sealing time was 0.5 seconds. A maximum target strength of the heat sealing was set to be not smaller than 30 N/15 mm, and strengths smaller than this value were judged to be of not practicable levels.

Example 1

By using a resin composition of (A-1) ethylene/methacrylic acid/isobutyl acrylate copolymer ① and (B-1) ethylene/methacrylic acid copolymer ① blended at a ratio shown in Table 1 as a resin to be extrusion-laminated, there were prepared the lamination constitutions ①, ② and ③ by the method of producing the laminated film described in 2. above, and were evaluated for their extrusion-lamination processability, adhesive force to the polyester film, adhesive force to the aluminum foil and heat-sealing strength according to the items to be evaluated and methods of evaluation described in 3. above.

In conducting the extrusion-lamination processing, the resin temperature was set to 300° C., and the above resin composition was extrusion-laminated on the surface of the polyester film of the side corona-treated. The results were as shown in Table 1.

Example 2

The laminated film was prepared according to the same method and under the same conditions as those of Example 1 but changing the resin temperature during the extrusion-lamination processing to 320° C., and the extrusion-lamination processability and the physical properties were evaluated. The results were as shown in Table 1.

Comparative Example 1

The laminated film was prepared according to the same method and under the same conditions as those of Example 1 but changing the resin temperature during the extrusion-lamination processing to 270° C., and was evaluated. The obtained laminated film exhibited an adhesive force to the polyester film of as very low as 0.1 N/15 mm. The heat-sealing strength did not reach the practicable level, and the laminated film was judged to be not suited as a packaging material. The results were as shown in Table 1.

Comparative Example 2

The extrusion-lamination processing was conducted according to the same method and under the same conditions as those of Example 1 but changing the resin temperature during the extrusion-lamination processing to 350° C. In this case, however, the resin composition developed foaming during the extrusion-lamination processing, and the laminated film of the molten state was perforated. Therefore, the laminated film could not be sampled and could not be evaluated. The results were as shown in Table 1.

Comparative Example 3

The laminated film was prepared according to the same method and under the same conditions as those of Example 1 but laminating the polyester film on the surface of the side not treated with corona (surface wet tension of 44 dyns/cm) and changing the resin temperature to 320° C., and its physical properties were evaluated. The obtained laminated film exhibited an adhesive force to the polyester film of as very low as 0.8 N/15 mm. The heat-sealing strength did not reach the practicable level, and the laminated film was judged to be not suited as a packaging material. The results were as shown in Table 1.

Example 3

A laminated film was prepared according to the same method and under the same conditions as those of Example 1 but using (A-2) ethylene/methacrylic acid, isobutyl acrylate copolymer ② alone as the resin to be extrusion-laminated, and its physical properties were evaluated. The results were as shown in Table 1.

Example 4

By using a resin composition of (A-2) ethylene/methacrylic acid/isobutyl acrylate copolymer ② and (C-1) ethylene/α-olefin copolymer ① blended at a ratio shown in Table 1 as a resin to be extrusion-laminated, there were prepared the lamination constitutions ①, ② and ③ by the method of producing the laminated film described in 2. above, and were evaluated for their extrusion-lamination processability, adhesive force to the polyester film, adhesive force to the aluminum foil and heat-sealing strength according to the items to be evaluated and methods of evaluation described in 3. above.

In conducting the extrusion-lamination processing, the resin temperature was set to 285° C., and the above resin composition was extrusion-laminated on the surface of the polyester film of the side corona-treated. The results were as shown in Table 2.

Example 5

A laminated film was prepared according to the same method and under the same conditions as those of Example 4 but using (C-2) ethylene/α-olefin copolymer ② instead of the component (C-1) as the resin to be extrusion-laminated and changing the resin temperature during the extrusion-lamination processing to 300° C., and was evaluated. The results were as shown in Table 2.

Example 6

A laminated film was prepared according to the same method and under the same conditions as those of Example 4 but using (C-3) ethylene/α-olefin copolymer ③ instead of the component (C-1) as the resin to be extrusion-laminated and changing the resin temperature during the extrusion-laminate processing to 300° C., and was evaluated. The results were as shown in Table 2.

Comparative Example 4

The laminated film was prepared according to the same method and under the same conditions as those of Example 5 but laminating the polyester film on the surface of the side not treated with corona (surface wet tension of 44 dyns/cm), and was evaluated. The obtained laminated film exhibited an adhesive force to the polyester film of as very low as 0.7 N/15 mm. The heat-sealing strength did not reach the practicable level, and the laminated film was judged to be not suited as a packaging material. The results were as shown in Table 2.

Example 7

Properties were evaluated by according to the same method and under the same conditions as those of Example 1 but using a resin composition of (A-1) ethylene/methacrylic acid/isobutyl acrylate copolymer ①, (B-1) ethylene/methacrylic acid copolymer ① and (C-1) ethylene/α-olefin copolymer ① blended at a ratio shown in Table 2 as a resin to be extrusion-laminated and changing the resin temperature to 315° C. The results were as shown in Table 2.

Comparative Example 5

The laminated film was prepared according to the same method and under the same conditions as those of Example 7 but laminating the polyester film on the surface of the side not treated with corona (surface wet tension of 44 dyns/cm), and was evaluated. The obtained laminated film exhibited an adhesive force to the polyester film of as very low as 0.6 N/15 mm. The heat-sealing strength did not reach the practicable level, and the laminated film was judged to be not suited as a packaging material. The results were as shown in Table 2.

Example 8

Properties were evaluated according to the same method and under the same conditions as those of Example 1 but using a resin composition of (A-2) ethylene/methacrylic acid/isobutyl acrylate copolymer ② and (C-2) ethylene/α-olefin copolymer ② blended at a ratio shown in Table 3 as a resin to be extrusion-laminated, delivering the surface of the polyester film which has not been treated with corona as the surface to be laminated, and executing the extrusion-lamination by effecting the corona-treatment using a corona-treating apparatus installed in the laminator just prior to executing the extrusion-lamination. The corona-treating conditions were as follows:

Corona-treating apparatus: Manufactured by Kasuga Denki Co.

Treating condition: 40 W/m²/min.

Surface wet tension after the treatment: 58 dyns/cm

The results were as shown in Table 3.

Example 9

The laminated film was prepared according to the same method and under the same conditions as those of Example 1 but so preparing the resin composition of Example 1 that 18% of the carboxylic acid group of the unsaturated carboxylic acid was ionized with zinc and changing the temperature of the extrusion-laminated resin to 315° C., and its physical properties were evaluated. The results were as shown in Table 4.

Comparative Example 6

The extrusion-lamination processing was executed according to the same method and under the same conditions as those of Example 1 but using a resin composition of (A-2) ethylene/methacrylic acid/isobutyl acrylate copolymer ② and (C-1) ethylene/α-olefin copolymer ① blended at a ratio shown in Table 3 as a resin to be extrusion-laminated and changing the resin temperature to 315° C. In this case, however, both ends of the molten resin film swung to a large extent during the extrusion-lamination processing and did not remain stable. Therefore, the laminated layer coupled not be sampled. The results were as shown in Table 3.

Comparative Example 7

The laminated film was prepared according to the same method and under the same conditions as those of Example 1 but using (B-2) ethylene/acrylic acid copolymer ② alone as a resin to be extrusion-laminated and changing the resin temperature to 310° C. The obtained laminated film exhibited an adhesive force to the polyester film of as very low as 0.6 N/15 mm. The heat-sealing strength did not reach the practicable level, and the laminated film was judged to be not suited as a packaging material. The results were as shown in Table 3.

Comparative Example 8

Properties were evaluated according to the same method and under the same conditions as those of Example 1 but using a resin composition of (B-2) ethylene/acrylic acid copolymer ② and (C-2) ethylene/α-olefin copolymer ② blended at a ratio shown in Table 3 as a resin to be extrusion-laminated and changing the resin temperature to 310° C. The obtained laminated film exhibited an adhesive force to the polyester film of as low as 1.7 N/15 mm. The heat-sealing strength did not reach the practicable level, and the laminated film was judged to be not suited as a packaging material. The results were as shown in Table 3.

Comparative Example 9

Properties were evaluated according to the same method and under the same conditions as those of Example 1 but using (D-1) polyethylene alone as a resin to be extrusion-laminated. The obtained laminated film exhibited an adhesive force to the polyester film of 2.6 N/15 mm which was slightly smaller than the target strength. The adhesive strength to the aluminum foil did not reach the practicable level, and the laminated film was judged to be not suited as a packaging material.

Comparative Example 10

Properties were evaluated according to the same method and under the same conditions as those of Example 1 but using (E-1) ethylene/ethyl acrylate copolymer ① alone as a resin to be extrusion-laminated. The obtained laminated film exhibited an adhesive force to the polyester film of as very small as 0.9 N/15 mm. Besides, the adhesive strength to the aluminum foil was very small, and the laminated film was judged to be not suited as a packaging material.

Comparative Example 11

The laminated film was prepared according to the same method and under the same conditions as those of Example 1 but so preparing the resin composition of Example 1 that 35% of the carboxylic acid based on the unsaturated carboxylic acid was ionized with zinc and changing the temperature of the extrusion-laminated resin to 315° C., and its physical properties were evaluated. The results were as shown in Table 4.

As will be obvious from Tables 1 to 3, it was confirmed that a laminate having a practically sufficient adhesive force to the polyester and heat-sealing property was obtained by extrusion-laminating the resin composition of the present invention onto a polyester film according to a predetermined extrusion-lamination processing method and under predetermined conditions. It was further confirmed that the resin composition of the invention exhibited excellent extrusion-lamination adhesiveness to the polar base member as represented by an aluminum foil, and was suited for laminating the polyester film with various polar base members.

TABLE 1

|  | Example 1 | Example 2 | Comparative Example 1 | Comparative Example 2 | Comparative Example 3 | Example 3 |
|---|---|---|---|---|---|---|
| Laminated-resin composition (pts by wt.) | | | | | | |
| (A-1) Copolymer ① | 50 | 50 | 50 | 50 | 50 | |
| (A-2) Copolymer ② | | | | | | 100 |
| (B-1) Ethylene/methacrylic acid copolymer ① | 50 | 50 | 50 | 50 | 50 | |
| (B-2) Ethylene/acrylic acid copolymer ② | | | | | | |
| (C-1) Ethylene/ α-olefin copolymer ① | | | | | | |
| (C-2) Ethylene/ α-olefin copolymer ② | | | | | | |
| (C-3) Ethylene/ α-olefin copolymer ③ | | | | | | |
| (D-1) Polyethylene | | | | | | |
| (E-1) Ethylene/ethyl acrylate copolymer | | | | | | |
| Content of copolymer component in the laminated resin (% by wt.) | | | | | | |
| Unsaturated carboxylic acid | 4 | 4 | 4 | 4 | 4 | 11 |
| (meth)acrylic acid ester | 7.5 | 7.5 | 7.5 | 7.5 | 7.5 | 8 |
| Extrusion-laminated resin temp. (° C.) | 300 | 320 | 270 | 350 | 320 | 300 |
| Surface wet tension of laminated surface of polyester film (dyns/cm) | 56 | 56 | 56 | 56 | 44 | 56 |
| Extrusion-lamination processability | | | | | | |
| Max. Processing rate (m/min) | 400< | 400< | 300 | | 400< | 400< |
| Condition of laminated film | ○ | ○ | ○ | X | ○ | ○ |
| Adhesive force to polyester film (N/15 mm) | 6.9 | 10.6 | 0.1< | could not be evaluated | 0.8 | 4.6 |
| Adhesive force to aluminum foil (N/15 mm) | 2.7 | 2.8 | 2.8 | could not be evaluated | 2.8 | 2.8 |
| Heat-sealing strength (N/15 mm) | | | | | | |
| 120° C. | 35 | 37 | 12 | could not be evaluated | 14 | 39 |
| 140° C. | 36 | 38 | 14 | could not be evaluated | 16 | 40 |
| 160° C. | 36 | 38 | 13 | could not be evaluated | 16 | 41 |

TABLE 2

|  | Example 4 | Example 5 | Comparative Example 4 | Example 6 | Example 7 | Comparative Example 5 |
|---|---|---|---|---|---|---|
| Laminated-resin composition (pts by wt.) | | | | | | |
| (A-1) Copolymer ① | | | | | 45 | 45 |
| (A-2) Copolymer ② | 90 | 90 | 90 | 90 | | |
| (B-1) Ethylene/methacrylic acid copolymer ① | | | | | 45 | 45 |
| (B-2) Ethylene/acrylic acid copolymer ② | | | | | | |
| (C-1) Ethylene/ α-olefin copolymer ① | 10 | | | | 10 | 10 |

TABLE 2-continued

|  | Example 4 | Example 5 | Comparative Example 4 | Example 6 | Example 7 | Comparative Example 5 |
|---|---|---|---|---|---|---|
| (C-2) Ethylene/ α-olefin copolymer ② |  | 10 | 10 |  |  |  |
| (C-3) Ethylene/ α-olefin copolymer ③ |  |  |  |  | 10 |  |
| (D-1) Polyethylene |  |  |  |  |  |  |
| (E-1) Ethylene/ethyl acrylate copolymer |  |  |  |  |  |  |
| Content of copolymer component in the laminated resin (% by wt.) |  |  |  |  |  |  |
| Unsaturated carboxylic acid | 9.9 | 9.9 | 9.9 | 9.9 | 3.6 | 3.6 |
| (meth)acrylic acid ester | 7.2 | 7.2 | 7.2 | 7.2 | 6.8 | 6.8 |
| Extrusion-laminated resin temp. (° C.) | 285 | 300 | 300 | 300 | 315 | 315 |
| Surface wet tension of laminated surface of polyester film (dyns/cm) | 56 | 56 | 44 | 56 | 56 | 44 |
| Extrusion-lamination processability |  |  |  |  |  |  |
| Max. Processing rate (m/min) | 400< | 400< | 400< | 370 | 400< | 400< |
| Condition of laminated film | ○ | ○ | ○ | ○ | ○ | ○ |
| Adhesive force to polyester film (N/15 mm) | 3.5 | 7.1 | 0.7 | 5.4 | 9.4 | 0.6 |
| Adhesive force to aluminum foil (N/15 mm) | 2.6 | 2.8 | 2.8 | 2.8 | 2.8 | 2.8 |
| Heat-sealing strength (N/15 mm) |  |  |  |  |  |  |
| 120° C. | 37 | not evaluated | 15 | not evaluated | not evaluated | not evaluated |
| 140° C. | 39 | not evaluated | 17 | not evaluated | not evaluated | not evaluated |
| 160° C. | 39 | not evaluated | 16 | not evaluated | not evaluated | not evaluated |

TABLE 3

|  | Example 8 | Comparative Example 6 | Comparative Example 7 | Comparative Example 8 | Comparative Example 9 | Comparative Example 10 |
|---|---|---|---|---|---|---|
| Laminated-resin composition (pts by wt.) |  |  |  |  |  |  |
| (A-1) Copolymer ① |  |  |  |  |  |  |
| (A-2) Copolymer ② | 90 | 65 |  |  |  |  |
| (B-1) Ethylene/methacrylic acid copolymer ① |  |  |  |  |  |  |
| (B-2) Ethylene/acrylic acid copolymer ② |  |  | 100 | 90 |  |  |
| (C-1) Ethylene/ α-olefin copolymer ① |  | 35 |  |  |  |  |
| (C-2) Ethylene/ α-olefin copolymer ② | 10 |  |  | 10 |  |  |
| (C-3) Ethylene/ α-olefin copolymer ③ |  |  |  |  |  |  |
| (D-1) Polyethylene |  |  |  |  | 100 |  |
| (E-1) Ethylene/ethyl acrylate copolymer |  |  |  |  |  | 100 |
| Content of copolymer component in the laminated resin (% by wt.) |  |  |  |  |  |  |
| Unsaturated carboxylic acid | 9.9 | 7.2 | 5 | 4.5 | 0 | 0 |
| (meth)acrylic acid ester | 7.2 | 5.2 | 0 | 0 | 0 | 9 |
| Extrusion-laminated resin temp. (° C.) | 300 | 315 | 310 | 310 | 300 | 300 |
| Surface wet tension of laminated surface of polyester film (dyns/cm) | 58 | 56 | 56 | 56 | 56 | 56 |

TABLE 3-continued

|  | Example 8 | Comparative Example 6 | Comparative Example 7 | Comparative Example 8 | Comparative Example 9 | Comparative Example 10 |
|---|---|---|---|---|---|---|
| Extrusion-lamination processability | | | | | | |
| Max. Processing rate (m/min) | 370 | | 400< | 350 | 200 | 220 |
| Condition of laminated film | ○ | X | ○ | ○ | ○ | ○ |
| Adhesive force to polyester film (N/15 mm) | 7.9 | could not evaluated | 0.6 | 1.7 | 2.6 | 0.9 |
| Adhesive force to aluminum foil (N/15 mm) | not evaluated | could not evaluated | 3.7 | 3.5 | 1.6 | 0.3 |
| Heat-sealing strength (N/15 mm) | | | | | | |
| 120° C. | not evaluated | could not be evaluated | 18 | 18 | not evaluated | not evaluated |
| 140° C. | not evaluated | could not be evaluated | 20 | 19 | not evaluated | not evaluated |
| 160° C. | not evaluated | could not be evaluated | 19 | 17 | not evaluated | not evaluated |

TABLE 4

|  | Example 9 | Comparative Example 11 |
|---|---|---|
| Laminated-resin composition (parts by wt.) | | |
| (A-1) Copolymer ① | 50 | 50 |
| (B-1) Ethylene/methacrylic acid copolymer ① | 50 | 50 |
| Content of copolymer component in the laminated resin (% by wt.) | | |
| Unsaturated carboxylic acid | 4 | 4 |
| (meth)acrylic acid ester | 7.5 | 7.5 |
| Ratio of ionized unsaturated carboxylic acid (%) | 18 | 35 |
| Extrusion-laminated resin temp. (° C.) | 315 | 315 |
| Surface wet tension of laminated surface of polyester film (dyns/cm) | 56 | 56 |
| Extrusion-lamination processability | | |
| Max. Processing rate (m/min) | 400< | 400< |
| Condition of laminated film | ○ | ○ |
| Adhesive force to polyester film (N/15 mm) | 6.8 | 2.8 |
| Adhesive force to aluminum foil (N/15 mm) | 2.6 | 2.4 |
| Heat-sealing strength (N/15 mm) | | |
| 120° C. | 33 | 20 |
| 140° C. | 34 | 22 |
| 160° C. | 35 | 23 |

According to the present invention, it is allowed to obtain a laminated film having excellent extrusion processability and exhibiting a large interlayer adhesive force upon being extrusion-laminated directly on the polyester film. Even when sandwich-laminated together with a polar base member, the laminated film exhibits good interlayer adhesive force to the polar base member. Besides, there is no need of executing the anchor-coat processing for the polyester film offering advantage from the standpoint of maintaining sanitary environment. Moreover, since the molten resin film of the extrusion-laminated resin needs not be treated with ozone, the packaging material can be produced at a low cost, offering a great merit for the manufacturers of the packaging materials. The thus obtained laminated film can be extensively used as a variety of packaging members for packaging foods such as cakes, daily dishes, beverages, processed meet, etc. which are packaged by using polyester films.

What is claimed is:

1. A method of producing a laminated film by extrusion-laminating comprising the step of:

extrusion-laminating on the surface of a polyester film of which the surface is oxidized and has a surface wet tension of not smaller than 45 dyns/cm, (1) an extrusion-lamination resin comprising an ethylene/unsaturated carboxylic acid/(meth)acrylic acid ester copolymer or a mixture resin composition thereof with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of said extrusion-laminated resin components, or (2) an extrusion-lamination resin comprising a mixture resin composed of:

(a) 100 parts by weight of the mixture resin component of an ethylene/unsaturated carboxylic acid/(meth)acrylic acid ester copolymer or the mixture resin composition of said ethylene/unsaturated carboxylic acid/(meth)acrylic acid ester copolymer with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of the extrusion-laminated resin components, and (b) not more than 30 parts by weight of an ethylene/α-olefin copolymer resin having a density of 840 to 900 kg/m$^3$, at a resin temperature of from 280 to 340° C.

2. A method of producing a laminated film according to claim 1, wherein said extrusion-lamination resin is extrusion sandwich-laminated between said polyester film and another polar base member.

3. A method of producing a laminated film by extrusion-laminating, comprising the step of:

extrusion-laminating on the surface of a polyester film, an ethylene/unsaturated carboxylic acid/(meth)acrylic acid ester copolymer or a mixture resin composition thereof with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of said extrusion-laminated resin components, at a resin temperature of from 280 to 340° C.

4. The method of claim 3, wherein the carboxylic acid group in said copolymer or said mixture resin composition is partly ionized with an alkali metal ion or an alkaline earth metal ion within a range in which the ionization degree is not larger than 20%.

5. The method of claim 3, wherein another polar base member is laminated on the polyester film via the extrusion-laminated resin.

6. The method of claim 5, wherein the polar base member is selected from the group consisting of an aluminum foil, an aluminum-deposited polyester film, an aluminum-deposited polypropylene film, a silica-deposited polyester film, alumina-deposited polyester film, a polyamide film, an ethylene/vinyl alcohol copolymer film and a paper.

7. The method of claim 3, wherein the carboxylic acid group in said copolymer or said mixture resin composition is partly ionized with a zinc ion within a range in which the ionization degree is not larger than 20%.

8. A method of producing a laminated film by extrusion-laminating onto at least one surface of a polyester film, a mixture resin comprising:

(a) 100 parts by weight of the mixture resin component of an ethylene/unsaturated carboxylic acid/(meth)acrylic acid ester copolymer, or the mixture resin composition of said ethylene/unsaturated carboxylic acid/(meth)acrylic acid ester copolymer with an ethylene/unsaturated carboxylic acid copolymer and/or an ethylene/(meth)acrylic acid ester copolymer, the amount of the unsaturated carboxylic acid component being from 1 to 12% by weight and the amount of the (meth)acrylic acid ester component being from 2 to 25% by weight with respect to the total amount of the extrusion-laminated resin components; and (b) not more than 30 (excluding 0) parts by weight of an ethylene/α-olefin copolymer resin having a density of from 840 to 900 kg/m$^3$, at a resin temperature of from 280 to 340° C.

9. The method of claim 8, wherein the carboxylic acid group in said mixture resin composition is partly ionized with an alkali metal ion or an alkaline earth metal ion within a range in which the ionization degree is not larger than 20%.

10. The method of claim 8, wherein another polar base member is laminated on the polyester film via the extrusion-laminated resin.

11. The method of claim 10, wherein the polar base member is selected from the group consisting of an aluminum foil, an aluminum-deposited polyester film, an aluminum-deposited polypropylene film, a silica-deposited polyester film, alumina-deposited polyester film, a polyamide film, an ethylene/vinyl alcohol copolymer film and a paper.

* * * * *